May 9, 1939.   G. G. URQUHART   2,157,579
APPARATUS FOR AND METHOD OF RECOVERING GASOLINE AND THE LIKE
Original Filed July 21, 1936
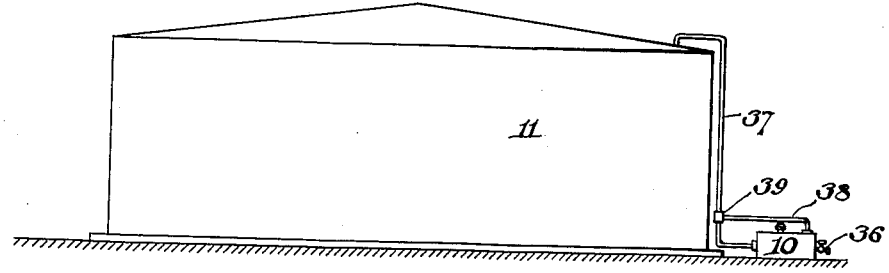
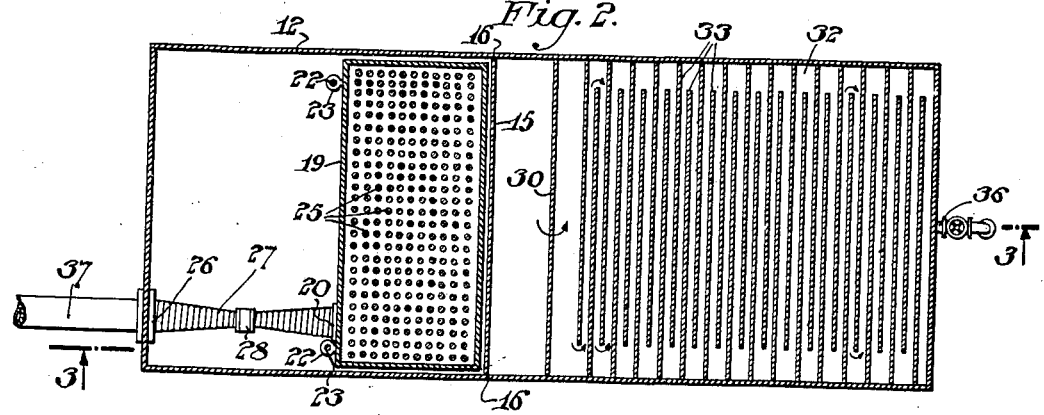
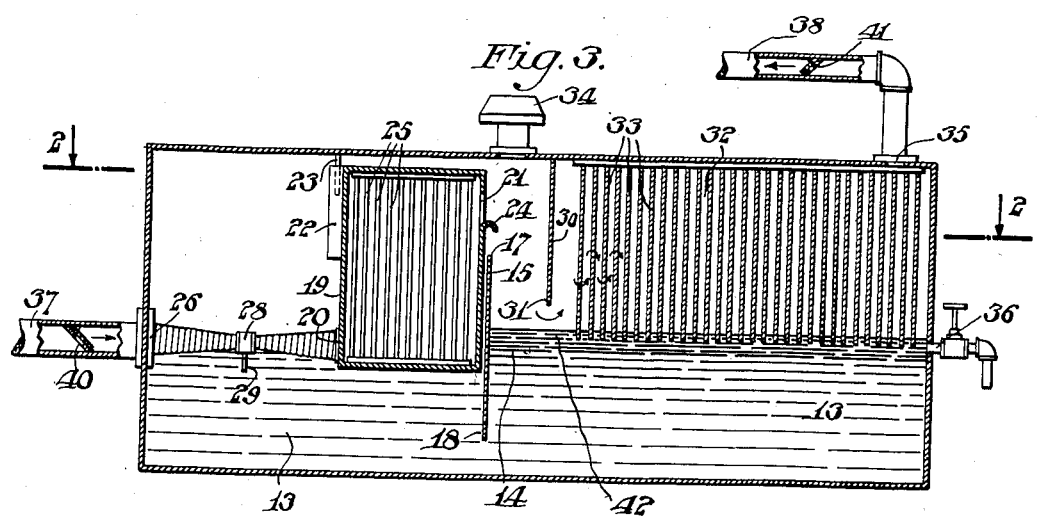
Inventor:
GEORGE GORDON URQUHART,
By Leo Edelson
Attorney.

Patented May 9, 1939

2,157,579

UNITED STATES PATENT OFFICE 2,157,579

APPARATUS FOR AND METHOD OF RECOVERING GASOLINE AND THE LIKE

George Gordon Urquhart, Cynwyd, Pa.

Original application July 21, 1936, Serial No. 91,648. Divided and this application June 30, 1937, Serial No. 151,114

9 Claims. (Cl. 220—85)

This invention relates to a method of and apparatus for the recovery of volatile petroleum products ordinarily lost by evaporation from bulk-storage station tanks.

This application is a division of my co-pending application Serial No. 91,648, filed July 21, 1936, for an Apparatus for and method of recovering gasoline and the like.

As is pointed out in the United States Bureau of Mines Report of Investigations 3138, issue of August 1931, large quantities of gasoline are lost annually by evaporation from bulk-storage station tanks, the rate of evaporation being influenced by two principal factors:—first, the vapor pressure of the gasoline in the tank; and, second, the amount of "breathing" of the tank. The "breathing" of the tank is caused by the inflow of air from the atmosphere during certain parts of the day and the expulsion of the air-vapor mixtures at other times, caused by atmospheric variations. While this "breathing" occurs regularly in standing storage as well as in bulk-storage tanks, the latter are subject to still further evaporation losses due to the fact that bulk-storage tanks are repeatedly filled and emptied while in actual service, it having been found that the major evaporation losses occur when the tank is being either filled or emptied. Thus, in filling the tank, the gasoline saturated vapors are displaced in the tank by the incoming gasoline, while in the emptying of the tank the vapor spaces above the gasoline increase as the liquid level declines, thus increasing the actual volume of the air-vapor mixture expelled from the tank when "breathing out".

In the aforesaid United States Bureau of Mines report, reference is made to several methods for reducing these evaporation losses, principal of which are to use vapor-tight tanks equipped with relief valves and operating at one or two ounces of pressure and about one-half ounce vacuum, and to reduce the temperature of the tanks and their contents by painting them a light color, by insulation and by using water sprays. Even by the use of these expedients, it has not been possible to entirely avoid evaporation losses, it being pointed out in the report that although the evaporation losses ranged from 1.40 percent in a test tank painted white and protected with an insulated housing to 3.54 percent in a red-painted test tank, the losses would have been even greater had the tanks been in actual service as bulk-station tanks during the same period instead of in standing storage.

In further efforts to reduce evaporation losses, resort has been had to the use of specially designed tanks capable of withstanding relatively high pressures, for example, up to five pounds, but these tanks are quite expensive to construct and maintain and moreover introduce an undesirable hazard. In spite of all these attempts to reduce the evaporation losses, the actual losses from bulk-storage tanks in the United States alone each year are known to be so great that various methods have been proposed for recovering the evaporated vapors. However, these methods have proved to be so costly that heretofore and prior to this invention most of the evaporated vapors have been permitted to vent to atmosphere, the industry having concentrated its efforts not so much upon actual recovery of the vapors escaping from the tank, but on reduction of the amount of vapors so lost.

Having in mind the foregoing considerations, the present invention has among its principal objects to provide a method whereby the "breathing" action of the tank, which is one of the principal factors governing the loss of volatile petroleum products by evaporation from bulk storage tanks, is taken advantage of and utilized in the recovery of the evaporated products.

More specifically, it is an object of the present invention to provide a method for the recovery of volatile products of vapors ordinarily subject to loss by escape to the atmosphere which consists in directing the air-vapor mixture to a liquid of such character that upon introduction of the mixture to the liquid a froth is produced capable of sorbing a portion of the vapors to an extent sufficient to permit their subsequent recovery.

A further object of the invention is to provide a method for recovering volatile petroleum products ordinarily lost by evaporation from bulk-storage station tanks which consists in utilizing the expansion of the vapor-laden air in the tank resulting from a rise in temperature thereof to cause the vapors to pass out of the normal vapor space of the tank to a separate chamber where the vapors are collected for subsequent recovery in either liquid or vapor state and from whence they may be returned, if desired, into the tank when the internal pressure of the latter falls due to a drop in temperature.

Still another object of the invention is to provide a method of recovering volatile petroleum vapors and the like from an air-laden mixture thereof consisting of passing the mixture through a solution to form an unstable emulsion from which the vapor separates in liquid form for subsequent recovery.

Still another object is to provide a method of recovering volatile petroleum vapors and the like from an air-laden mixture thereof which consists in passing the mixture through an emulsifying solution in such manner as to generate a body of foam, each bubble of which has an affinity for and serves as a supporting vehicle for the vapor to be recovered, the foam-forming action being of such continuous nature during the passage of the air-laden mixture through the emulsifying liquid that as the originally formed foam collapses, it is replaced by subsequently formed foam, the collapse of the foam resulting in the release of lean air for escape to atmosphere at the same time that the vapor is converted into liquid state for subsequent recovery either by decantation or by reabsorption into the tank together with and by means of air drawn into the tank during the period when its internal pressure drops below a predetermined limit.

The formation of the vapor supporting foam bubbles constitutes an important object of the present invention because the formation of this foam affords a large contact surface for the vapor without necessitating any increase in the internal pressure of the storage tank beyond that normally prevailing. In order to insure a maximum volume of the vapor supporting foam bubbles and to avoid premature collapse thereof, it is a further object to provide means in the foam chamber of the apparatus of the present invention to support the bubbles and guide them upwardly to a point of discharge into an adjoining chamber or compartment in which the foam subsides, collapse of the foam bubbles resulting in the release of the lean air and the transition into recoverable liquid state of the air-free vapor.

Other objects and advantages of the invention will appear more fully hereinafter, it being observed at this point that while in the foregoing general discussion of the problem which it is the objective of this invention to solve, reference is made specifically to the recovery of gasoline vapors, the present invention in fact is generally applicable to the recovery of other volatile vapors, such as those of benzol, toluol and xylol and particularly to the recovery of petroleum vapors ordinarily lost from oil storage tanks. The term "vapor" appearing hereinafter and in the claims is intended, therefore, to embrace all of the foregoing and such other volatile vapors not specifically mentioned which may be recovered by the method and apparatus hereinafter described and claimed.

In the accompanying drawing:—

Figure 1 is an elevational view of a bulk-storage tank equipped with the apparatus of the present invention for recovering vapors expelled from the tank due to increases in the internal pressure thereof occasioned by a rise in temperature or upon filling of the tank;

Figure 2 is a horizontal sectional view of the vapor recovery unit taken on the line 2—2 of Figure 3; and Figure 3 is a vertical sectional view of said unit taken on the line 3—3 of Figure 2.

Referring now more particularly to the drawing, which illustrates a preferred arrangement of apparatus for effecting the method of vapor recovery of the present invention, it will be observed that the vapor recovery unit, designated generally by the reference numeral 10, is operatively associated with the bulk storage tank 11 in such manner that "breathing" of the tank, such as is caused by expulsion of the air-vapor mixture during certain periods of the day alternately with inflow of air from the atmosphere during other periods, automatically results in collection of the vapors in liquid state in the recovery unit and its return in vapor state into the tank. With the vapor recovery unit 10 arranged as shown, the vapor when reduced to liquid state also may be recovered by decantation for storage in a vessel other than the tank 11 from which the vapors originally issued, or by locating the recovery unit at a sufficient elevation with respect to the tank 11, the volatile product so recovered by decantation may be delivered by gravity directly into the tank. In all cases, the recovery unit is practically self-operating and functions continuously with a minimum of attention, it being merely necessary for such continuous operation that the emulsifying solution be maintained at a proper operating level. Preferably, the solution employed is one which does not evaporate readily and which is non-freezing in character, although the latter characteristic is not so essential because in freezing weather temperature variations are not sufficiently pronounced to result in any appreciable "breathing" of the tank and consequent loss of vapor therefrom.

The vapor recovery unit 10, as appears more clearly in Figures 2 and 3, comprises essentially a closed tank 12 in which is contained an emulsifying solution 13 of a character described hereinafter. The level of this solution remains practically constant and is indicated by the numeral 14. Extending transversely of the tank 12 is a separator element in the form of a flat partition 15 the opposite vertical side edges 16—16 of which are integrally united to the opposite side walls of the tank 12, while the upper and lower horizontal edges 17 and 18 thereof are respectively spaced from the top and bottom walls of the tank. As clearly appears in Figure 3, while the partitioning element 15 is submerged in the solution 13 to a substantial extent, its lower edge 18 is spaced above the bottom of the tank sufficiently to permit the solution to freely seek and maintain an approximately uniform level throughout the tank.

Arranged immediately in advance of the transverse partitioning member 15 is an internal box-like compartment or chamber 19 closed upon all sides except for an inlet opening 20 and a discharge outlet 21, the latter being preferably in the form of a rectangular opening extending across the entire width of the box-like chamber 19. This chamber is buoyantly supported in position by the solution 13 and is maintained against any but a vertical rectilinear movement by suitable guide means, such as the laterally spaced guide tubes 22—22 carried by the chamber 19 for slidable association with stationary pins 23—23 fixed to and depending from the top wall of the tank 12. The rear wall of the chamber 19 is in flatwise engagement with the separating partition 15, the lower edge of its discharge opening being outwardly turned to provide a shelf-like projection 24 above the upper edge 17 of the fixed partition. Disposed interiorly of the chamber 19 in more or less closely spaced relation are a series of vertically extending glass rods or tubes 25, the opposite ends of which are suitably fixed to the top and bottom walls of the chamber.

The tank 12 is provided in its forward end wall with an air-vapor inlet opening 26 located so that its center is approximately at the normal level of the solution 13 in the tank, it being observed in this connection that the inlet opening 20 of the chamber 19 is so located with respect to the solution level that its horizontal axis is always coincident therewith. This fixed relationship between the inlet opening 20 of the internal chamber and the level of the solution 13 is constantly maintained due to the fact that the chamber 19 floats upon or is buoyantly supported by the solution.

Extending between and interconnecting the tank inlet 26 and the internal chamber inlet 20 is a suitably flexible conduit-shaped mixing device 27, the internal bore of which is reduced at the center 28 thereof. Depending from and communicating with the interior of the reduced central part 28 of the mixing device is an open-ended tap 29 by way of which the solution 13 passes into the mixing device. It will be understood that the solution 13 is normally maintained at a level such that approximately the lower half of the internal bore of the mixing device is at all times filled with the solution.

Disposed to the rear of the partitioning member 15 and extending transversely of the tank 12 from side wall to side wall thereof is a second partitioning member or baffle 30. This baffle 30 projects downwardly from the top wall of the tank 12 to a distance such that its lower horizontal edge 31 is spaced above the level of the solution 13. This baffle 30 forms in effect the forward wall of a compartment 32, the bottom of which is the upper surface 14 of the solution 13. Arranged within this compartment 13 in the staggered relation shown most clearly in Figure 2 are a plurality of vertically disposed parallel fins or wicks 33 of felt or other such fibrous material. It will be observed that these wicks 33 are alternately secured along their outer vertical edges to the opposite side walls of the tank 12, while the upper edges thereof are all in intimate engagement with and secured to the top wall of said tank. The lower horizontal edges of the wicks extend to a horizontal plane disposed slightly below the surface 14 of the solution 13. By means of this arrangement of the wicks 33 it will be noted that the air which may be drawn into the compartment 32 by way of the space provided below the lower edge 31 of the baffle 30 may be directed through the said compartment by following the tortuous path provided by the staggered wicks 33. This circulation of the air through the compartment 32 and around the wicks 33 is indicated by the arrows in Figures 2 and 3.

Mounted upon the top wall of the tank 12 at a point between the vertical planes of the members 15 and 30 is a flame arrester 34 or other such device which permits air to be drawn interiorly of the tank from the atmosphere whenever the tank is subjected to a small vacuum pull. In addition, the tank is provided with a vapor discharge outlet 35 and with a valve controlled tap 36 by means of which the recovered vapor in liquid state may be decanted from the recovery unit.

The vapor recovery unit of the character just described is connected to the bulk-storage tank 11 as shown in Figure 1 from which it will appear that the air-vapor intake 26 of the recovery unit 10 is connected by means of a conduit 37 to the top of the bulk storage tank or to any other point of the latter, insuring free communication between the air-vapor space in the bulk-storage tank and the air-vapor intake 26 of the recovery unit. The discharge outlet 35 of the recovery unit is connected by means of the conduit 38 to the conduit 37 at a point 39 sufficiently elevated above the recovery unit to insure proper operation thereof. Preferably, the conduit 37 is provided with a check valve 40 between the intake 26 of the recovery unit and the point 39 at which the conduit 38 is tapped into the conduit 37 while the conduit 38 is provided with a check valve 41 located at any desired point in the length thereof.

Before describing in detail the operation of the recovery unit and the method by which the vapor expelled from the storage tank is recovered, further reference is had to the solution 13 employed in the tank 12 of the recovery unit. This solution is of such nature that upon passing the air-vapor mixture therethrough by means of the mixing device 27, froth or foam is built up within the box-like compartment 19, each bubble of which serves as an individual carrier or supporting vehicle for the vapor to be recovered. Subsequent collapse of these foam bubbles results in escape of the lean air from the air-vapor mixture after sorption of the vapor by the foamy mass with consequent release of the vapor in liquid state, the latter being separated in the process from the solution to form a separate layer 42 (see Figure 3) overlying the solution. The solution which is thus separated from the vapor upon collapse of the foam bubbles passes through the liquid hydrocarbon layer 42 to merge with the body of the solution contained in the tank 12 beneath said layer, it being apparent that due to the disposition of the member 15 the solution will constantly be returned to the front part of the tank 12 for re-use. Thus, a single supply of emulsifying solution is used over and over to effect the recovery of the vapor expelled from the storage tank.

A solution which I have found to be satisfactory for the above purposes may be prepared by dissolving 25 parts by volume of potassium oleate and 25 parts by volume of triethanolamine oleate in 50 parts by volume of an 8% solution of "Naccanol", the latter being produced by the National Aniline and Chemical Company. In place of the "Naccanol", which serves as a surface tension lowering, frothing and dispersing agent, other agents may be employed, as, for example, "Aresklene", made by the Monsanto Chemical Company.

The solution which may be employed is, of course, not restricted to the above formula because various other ingredients may be employed to produce the requisite solution, the principal characteristic of which is that it combines with the air-vapor mixture expelled from the storage tank to form a foamy mass the bubbles of which subsequently collapse to form a mixture capable of separating into liquefied hydrocarbon and the original solution. Instead of the above mentioned potassium and triethanolamine oleates, the latter alone may be employed or any other salts or esters of the higher fatty acids, including the acetylated higher fatty acids, may be substituted therefor, such as potassium, sodium or triethanolamine stearates or palmitates.

In addition and in order to increase the effectiveness of the solution, saponin may be added to the solution, as may monoethylether or diethylene glycol. The saponin assists in the foam formation and prevents premature collapse of the foam bubbles, while the monoethylether of diethylene glycol enhances the coupling action between the volatile petroleum products sought to be recovered and the emulsifying solution.

Assuming the tank 12 of the recovery unit to be filled with the aqueous solution 13 to the proper level so that the restricted central part 28 of the mixing device 27 is partially filled with the solution, the operation of the unit is as follows:—
When the storage tank 11 "breathes out", usually during the day when the temperature is high, the air-vapor mixture is expelled from the tank into the breather conduit 37 and is directed by the latter to the mixing device 27. As the air-vapor mixture passes through the restricted bore of the mixing device, it mixes with and churns the aqueous solution 13 contained therein to form a froth. This froth, which is thus composed of bubbles charged with the petroleum vapor, is discharged into the bottom of the chamber 19. Inasmuch as the froth is generated continuously as the air-vapor mixture is expelled from the storage tank, the froth builds up in the chamber 19 into the form of a foamy mass. The rods or tubes 25 in this chamber assist in raising the foam to the desired elevation, which is above the bottom edge 24 of the discharge opening 21. As the foam bubbles reach this opening 21, they are discharged therethrough into the space between the members 15 and 30 and thence drop down upon the surface of that part of the solution 13 located to the rear of the partition 15. As the foam is discharged through the opening 21, it subsides with the consequent result that the lean air is released and permitted to escape to atmosphere by way of the flame arrester 34. The resultant product of the collapsed foam bubbles is a mixture of the solution 13 and liquefied hydrocarbons free of air and when this product is delivered to the solution 13 the liquefied hydrocarbons separate out to form the layer 14 of recoverable gasoline or other such volatile liquid.

At this point it will be noted that the wicks 33 are so arranged that their lower edges dip into the layer 14 of the product to be recovered, which recovery may be effected by the "breathing in" action of the storage tank. When the tank "breathes in", usually at night, it sucks unsaturated air into the vapor space in the top of the tank. With the recovery unit 10 connected to the tank as shown, this unsaturated air is drawn into the vapor space of the tank by way of the flame arrester 34, the compartment 32, and the intake breather conduit 38. As the air is thus drawn through the compartment 32, it must of necessity circulate in and about the wicks 33 (following the tortuous route designated by the arrows in Figures 2 and 3). Inasmuch as the wicks 33 are constantly wetted with the recovered liquid hydrocarbons due to capillary action of the wicks upon the layer 14 thereof, circulation of unsaturated air in and about said wicks immediately results in its absorbing and becoming saturated with hydrocarbon vapors, which latter are then delivered by the vapor-saturated air into the storage tank by way of the conduit 38. This return or delivery of vapor-laden air to the tank continues so long as the tank continues to "breath-in". If desired, the recovered product in liquid state may be removed from the recovery unit by decantation through the use of the valve controlled conduit 36 which is tapped into a wall of the tank at an elevation just above the normal level of the solution 13 thereof. By mounting the unit above the normal level of the liquid content of the storage tank 11, the tap 36 may be employed to return the recovered liquid product by gravity directly into the tank.

It will be understood that the check valves 40 and 41 respectively operate to insure delivery of the vapor-laden air only in the directions indicated, the check valve 40 operating to prevent a reverse flow of the generated foam into the conduit 37 and the valve 41 operating to prevent discharge of the air-vapor mixture from the tank 11 through the conduit 38 during the interval that the tank is "breathing out". Conversely, when the tank is "breathing in", the check valve 40 prevents the passage of air from atmosphere to the tank by way of the chamber 19 and the mixing device 27.

Preferably, the solutes of the aqueous emulsifying solution 13 are of non-volatile character so that any loss in quantity of the solution due to evaporation would be confined entirely to the solvent. If this solvent is water, as in the example above given, any evaporation loss thereof may be readily made up by the addition of water from a supply automatically regulated to insure a constant level in the tank 12. The mixing device 27, by means of which the air-vapor mixture expelled from the storage tank is ebullated through the solution 13 to form the foamy mass of bubbles in the chamber 19, is subject to modification, as are other parts of the apparatus shown and described. In addition, certain other features may be incorporated in the apparatus to suit varying conditions of use thereof and to increase its efficiency of operation under certain conditions. For example, in order to dissipate heat from the recovery unit, it may be cooled by encasing it in a cooling water jacket. These and other modifications of the apparatus may be made from time to time without involving any departure from the method of the present invention or from the general principles of operation of the apparatus by which the method is practiced. Accordingly, it is intended to claim the invention or inventions described herein broadly, as well as specifically, as indicated by the appended claims.

What is claimed as new and useful is:

1. A method of recovering volatile vapors ordinarily lost to atmosphere by the breathing action of the tank in which the vapors are formed which consists in utilizing the "breathing out" action of the tank to expel vapor-saturated air, in ebullating said vapor-saturated air through a fluid having an affinity for the vapor content of the air-vapor mixture so as to release the air therefrom and effect the transition of the air-free vapor into liquid state, and in accumulating the liquefied vapor thus obtained during the "breathing-out" period.

2. A method of recovering volatile vapors ordinarily lost to atmosphere by the breathing action of the tank in which the vapors are formed which consists in utilizing the "breathing out" action to expel vapor-saturated air, in ebullating said vapor-saturated air through a fluid having vapor sorptive properties so as to release to atmosphere the air from the air-vapor moisture and effect the transition of the air-free vapor into liquid state, in accumulating a supply of the liquefied air-free vapor during the "breathing out" period, and in utilizing the "breathing in" action of the tank to draw into it air from atmosphere saturated with vapor obtained from said accumulated supply.

3. A method of returning into a tank vapors recovered therefrom which consists in reducing the recovered vapors into liquid state, in circulating air derived from the atmosphere over the liquefied vapors whereby to saturate the air with said vapors, and in utilizing the "breathing-in" action of the tank whenever occasioned by a lowering of the internal pressure thereof, to draw the vapor-saturated air into the tank.

4. An apparatus for recovering volatile petroleum products ordinarily lost from storage tanks by evaporation comprising, in combination, a tank to which said products are delivered in the form of an air-vapor mixture, said tank containing a solution having an affinity for the vapor portion of said mixture, means for ebullating said mixture through the solution to form a mass of bubbles composed of an emulsion of said solution and liquefied vapor, means confining said bubbles during the process of formation thereof to a restricted zone, and means effecting discharge of said bubbles upon a surface of the solution separated from said restricted zone so that upon subsidence of the bubbles an unstable emulsion is formed by dispersion of the liquefied vapors in the solution and from which the liquefied vapors are readily separated out in the form of a liquid layer floating upon the surface of the solution.

5. In an apparatus of the character defined in claim 4, means for venting to atmosphere the air released upon collapse of the bubbles.

6. In an apparatus for recovering volatile petroleum vapors expelled from storage tanks upon a rise of internal pressure thereof comprising, in combination, a vapor recovery unit operatively associated with the tank and including means for receiving the air vapor mixture expelled from the tank, means for releasing and venting to atmosphere the air bound in said mixture and for effecting transition of the vapor into liquid state, said last-mentioned means including a fluid bath through which said air-vapor mixture is ebullated to produce a foamy mass having vapor-sorbing properties.

7. In an apparatus for recovering volatile petroleum vapors expelled from storage tanks upon a rise of internal pressure thereof comprising, in combination, a vapor recovery unit operatively associated with the tank and including means for receiving the air vapor mixture expelled from the tank, means for releasing and venting to atmosphere the air bound in said mixture and for effecting transition of the vapor into liquid state, said last-mentioned means including a fluid bath through which said air-vapor mixture is ebullated to produce a foamy mass having vapor-sorbing properties, said unit being operative to accumulate said liquefied vapor continuously during the period that the air-vapor mixture is expelled from the tank due to a "breathing-out" action thereof.

8. In a vapor recovery unit of the character described, in combination, a tank adapted to contain a solution having an affinity for the vapor and of a character such that when an air-vapor mixture is ebullated through said solution a foamy mass of bubbles is formed constituting a large supporting surface for liquefied vapor, means in the tank for effecting the said ebullation of the air-vapor mixture through the solution, means for separating a portion of the solution from that portion thereof in which the ebullating action occurs, said means being arranged to provide free circulation of the solution from the separated portion thereof to the portion in which said ebullating action occurs, means for accumulating the liquefied vapor upon the surface of the separated portion of the solution, means for absorbing by capillary action the accumulated liquefied vapor, and means for circulating a current of unsaturated air through and about said last-mentioned means whereby said current of air becomes saturated with vapor, and means for returning said vapor-saturated air to the storage tank.

9. In an apparatus for recovering volatile petroleum vapors expelled from storage tanks upon a rise of internal pressure thereof comprising, in combination, a vapor recovery unit operatively associated with the tank and including means for receiving the air vapor mixture expelled from the tank, means for releasing and venting to atmosphere the air bound in said mixture and for effecting transition of the vapor into liquid state, said unit being operative to accumulate said liquefied vapor continuously during the period that the air-vapor mixture is expelled from the tank due to a "breathing-out" action thereof, and means for drawing air into the tank during the period of its "breathing-in" action, said last-mentioned means being operative to direct said air through the recovery unit in such manner that it becomes saturated with vapors absorbed from the accumulated supply of liquefied vapor in the unit.

GEORGE GORDON URQUHART.